United States Patent Office 3,049,515
Patented Aug. 14, 1962

3,049,515
HYDROXY-TERMINATED POLYETHER-BASED URETHANE COMPOSITIONS
Adolfas Damusis, Detroit, Mich., assignor to Wyandotte Chemicals Corporation, Wyandotte, Mich., a corporation of Michigan
No Drawing. Filed Mar. 26, 1959, Ser. No. 802,016
16 Claims. (Cl. 260—77.5)

The present invention relates to novel branched hydroxy-terminated polyether-based urethane compositions which are useful as hydroxy-terminated urethane components for two-component polyurethane coatings or corresponding one package systems which employ as the other, or diisocyanate ingredient, a blocked isocyanate, and which are also of special utility as bodying agents for urethane coatings, particularly when it is not desired to employ thermoplastic resins for such purpose.

It is an object of the present invention to provide novel bodying agents for urethane coatings. It is a further object to provide novel and valuable branched hydroxy-terminated urethane components for polyurethane coatings systems. A further object is the provision of such compositions which are polyether-based urethanes. Another object is the provision of such urethane compositions which lend advantageous properties to polyurethane coatings in which they are employed as the hydroxy-terminated component or ingredient. Still another object of the invention is the provision of a process for the production of such urethane compositions by the reaction of about one molar proportion of a selected arylene diisocyanate with about two molar proportions of a selected polyether polyol, and the products thereby produced. Other objects of the invention will become apparent hereinafter.

The foregoing and additional objects are accomplished by the provision of branched urethane compositions of the following idealized formula:

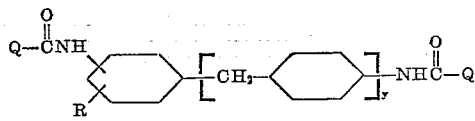

wherein R is selected from hydrogen and methyl, wherein y is a number from zero to one, inclusive, and wherein Q is the same in both occurrences and is the radical of a branched polyether polyol (b), which is a propylene oxide addition product of a lower alkanol containing at least three and not more than four hydroxy groups per molecule, said urethane composition being prepared by the reaction of about one molar proportion of arylene diisocyanate (a) selected from the group consisting of phenylene diisocyanate, tolylene diisocyanate, and diphenylmethane-4,4′-diisocyanate, with about two molar proportions of the selected branched polyether polyol (b).

The branched hydroxy-terminated urethane compositions of the present invention have certain advantages over ordinary hydroxyl-bearing materials such as polyesters and regular polyols. Polyurethane coatings prepared therefrom by reaction with an isocyanate-terminated component dry to touch upon evaporation of solvent, and have considerably less sagging tendency than polyurethane coating formulations incorporating regular polyols. When the branched hydroxy-terminated urethane compositions of the present invention are reacted with an isocyanate-terminated component, the resulting polyurethane surface coatings are characterized by properties which are superior to those obtained from the same isocyanate component and previously known polyhydroxy components. The same is true when they are employed as one ingredient of a one package surface coating composition together with a blocked diisocyanate as the other ingredient (for example, in baking enamels or wire coatings).

The branched hydroxy-terminated urethane compositions of the present invention are prepared by reacting about one molar proportion of an appropriate arylene diisocyanate (a), selected from phenylene diisocyanate, 2,4-tolylene diisocyanate, 2,6-tolylene diisocyanate, including mixtures of 2,4 and 2,6-tolylene diisocyanates, and diphenylmethane-4,4′-diisocyanate, with about two molar proportions of the selected branched polyether polyol (b) to produce a hydroxy-terminated urethane composition in which the terminal hydroxy groups are furnished by the polyether polyol molecule.

The branched polyether polyol (b) used in the reaction is a propylene oxide addition product of a lower alkanol, containing up to and including eight carbon atoms and containing at least three and not more than four hydroxy groups per molecule, and may be represented by the formula:

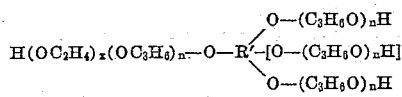

wherein R′ with attached oxygen atoms represents a lower-alkanol radical, n is a number from one to three, inclusive, and x and z are individually numbers from zero to one, inclusive, and need not be the same. Representative branched polyether polyols encompassed by this formula include the addition products of glycerine, hexanetriol, and trimethylolpropane with from three to nine moles of propylene oxide, the addition products of such polyols further reacted with one mole of ethylene oxide, the addition product of pentaerythritol with from four to twelve moles of propylene oxide, the addition products of such polyols further reacted with one mole of ethylene oxide, and the like. The terminal ethylene oxide unit, when added to the polyoxypropylene chain or unit, provides a primary hydroxy group of relatively high reactivity for definite direction and precedence of reaction with NCO groups in preparing the OH-terminated urethane from the starting arylene diisocyanate (a).

In practice, the molecular weights of the branched hydroxy-terminated urethane compositions of the invention prepared in the given manner, have been found to be very close to the molecular weight of a composition having an idealized structure, since very little polymerization occurs using predetermined molar proportions under moderate reaction conditions, viz., exclusion of moisture and initial reaction temperature, less than about 60° C. Also, in practice, a polyol having no more than about two propylene oxide units added per individual hydroxyl of starting polyol is usually preferred, and of the polyols, trimethylolpropane polyoxypropylene derivatives are preferred. As for the isocyanate employed, tolylene diisocyanate, usually a mixture of about 80%/20% of the 2,4 and 2,6 isomers, is preferred for reasons of economy. Other variations in the starting materials to procure variations in the substituents of the branched hydroxy-terminated urethane compositions may be usefully made to obtain polyurethane surface coatings of varying types and characteristics upon reaction with a selected polyisocyanate component. For example, lengthening of the polyoxypropylene chains shown in the above formulae results in a polyurethane coating having a longer pot life, greater flexibility, and lower solvent resistance, while shortening of these polyoxypropylene chains has just the opposite effect. Flexibility of such coatings can, for example, be readily adjusted by changing the length of the polyoxypropylene branches of the polyol (b), if desired. The preferred equivalent weight of the hydroxy-terminated urethanes of the present invention is between about 150 and 350.

The following examples are given to illustrate the present invention but are not to be construed as limiting.

GENERAL PROCEDURE

Hydroxy-terminated urethanes, such as OH-1 of Example 1, are prepared by reacting together about one mole of the selected arylene diisocyanate and about two moles of polyether triol or tetraol in order to form a hydroxy-terminated urethane with free OH groups on both ends of the molecule. The addition of two polyether triol molecules to the starting arylene diisocyanate makes the NCO/OH ratio 1/3, while two polyether tetraol molecules makes the ratio 1/4. Dilution of the OH-terminated urethane, if desired, may be with any suitable non-reactive surface coating solvent, or the reaction may be conducted in the presence of such a solvent. Many such solvents suitable in general for the urethane coatings and components thereof are known in the art, for example, 2-ethoxyethyl acetate, 2-methoxyethyl acetate, 2-butoxyethyl acetate, toluene, xylene, ethyl acetate, butyl acetate, amyl acetate, other similar esters, ketones, chlorinated solvents, nitro-aliphatic solvents, dioxane, and the like. In most instances no solvent is required during the reaction.

Polyether polyols used in the reaction are preferably stripped of water by azeotropic distillation with toluene. In this manner, the amount of water can be decreased from 0.08–0.15 to 0.02% or even less. A clean, dry, three-necked five-liter flask was used as a reaction vessel, and a nitrogen blanket was maintained over the reactants.

Example 1

(OH-1)

| Reactants | Moles | Parts | Weight, percent |
|---|---|---|---|
| Polyoxypropylene derivative of trimethylolpropane, M.W. 411, Pluracol TP-440 | 2 | 3,288 | 66 |
| Tolylene diisocynate, TDI (80/20; 2/4, 2/6) | 1 | 696 | 14 |
| 2-ethoxyethyl acetate | | 496 | 10 |
| Xylene | | 496 | 10 |
| | | 4,976 | 100 |

NOTE.—Ratio of ractive groups: NCO/OH=2/6=1/3.

Preparation of OH-1: 3288 parts of Pluracol TP-440 and 696 parts of tolylene diisocyanate are charged into a 5-liter reaction flask and stirred gently. The temperature of the exothermic reaction rises to 60° C. The blend is kept at this temperature for at least one hour until the exothermic reaction stops, whereafter 223 parts of 2-ethoxyethyl acetate and 223 parts of xylene are added in order to dilute the batch to 90% solids.

The temperature is then raised to 80° C. and the contents are heated for 3 hours with a gentle stirring. The viscosities are measured each hour.

Viscosity of the 90% solid batch reaches:

| | Gardner bubble viscosimeter readings | Centistokes |
|---|---|---|
| After 1st hour | V-Y | 800–1,760 |
| After 2nd hour | Z-Z₁ | 2,270–2,700 |
| After 3rd hour | Z₂-Z₄ | 3,390–6,340 |

273 parts of 2-ethoxyethyl acetate and 273 parts of xylene are added in order to dilute the batch to 80% solids. The contents are bottled.

Properties of OH-1:
- NCO/OH _____ 1/3
- Average molecular weight _____ 1000
- Average equivalent weight _____ 250
- Hydroxyl number _____ 224
- Percent hydroxyl _____ 6.8

Properties of OH-1 solution:
- Non-volatile, percent _____ 80
- Weight per gallon, lb. _____ 8.78
- Viscosity at 25° C., cps. _____ 500–2000

OH-1 in urethant coatings: Two typical urethane coating formulations are presented with hydroxy-terminated intermediate OH-1 as a second component.

TWO COMPONENT URETHANE COATINGS

| Composition | Formulation 1 | Formulation 2[1] |
|---|---|---|
| Isocyanate-terminated intermediate | [2] NCO-1 | [3] NCO-3 |
| Parts | 101 | 162 |
| Hydroxyl-terminated intermediate | OH-1 | OH-1 |
| Parts | 100 | 100 |
| NCO/OH | 1.2/1.0 | 1.2/1.0 |

[1] Numerous other organic polyisocyanates can be used as well as NCO-1 and NCO-3, such as, for example, tri TDI adduct of trimethylolpropane or hexanetriol, the phenylurethanes of any of the foregoing, TDI, DI, and the like.
[2] NCO-1 is the NCO-terminated reaction product of three moles of TDI with one mole of TP-440 polyol (propylene oxide addition product of trimethylolpropane having a M.W. of about 410).
[3] NCO-3 is the NCO-terminated reaction product of two moles of NCO-1 with one mole of P-410 polylol (polypropylene glycol, M.W. about 410).

| Properties | Formulation 1 | Formulation 2 |
|---|---|---|
| Curing time: | | |
| Dust free, hr | 1.5 | 1.5. |
| Dry to touch, hr | 3.0 | 3.0. |
| Pot life, hr | 36 | 42. |
| Sward hardness | 48–54 | 16–36. |
| Elongation, percent | 8 | 50–200. |
| Tensile strength, p.s.i. | 4,000–8,000 | 2,600–4,000. |
| Impact test–Gardner, inch-lb.: | | |
| Direct | 20 | over 30. |
| Indirect | 8 | over 30. |
| Chemical resistance | Exellent | Excellent. |
| Solvent resistance, hr.: | | |
| Toluene | >4 | >4. |
| 2-ethoxyethyl acetate | >4 | 3. |
| Methyl isobutyl ketone | >4 | 2. |
| Water resistance: | | |
| Immersion 24 hr., 25° C | No effect | No effect. |
| Immersion ½ hr., 100° C | do | Do. |
| Weatherometer test, 500 hr | No loss of gloss. | No loss gloss. |

Example 2

(OH-1A)

| Reactants | Moles | Parts |
|---|---|---|
| TDI (80/20; 2,4/2,6) | 1 | 174 |
| Polyoxypropylene derivative of pentaerythritol—6 moles PO to 1 of PE (M.W. 484) | 2 | 968 |
| 2-ethoxyethyl acetate | | 249 |
| Xylene | | 249 |

Preparation of OH-1A: Same as in Example 1.

Properties of OH-1A:
- NCO/OH _____ 1/4
- Molecular weight _____ 1148
- Equivalent weight _____ 192
- Hydroxyl number _____ 293
- Percent hydroxyl _____ 8.9

OH-1A in urethane surface coatings: When employed as the second component together with NCO-1 or NCO-3 in the NCO/OH proportions of Example 1, OH-1A gives urethane films which are less flexible but which have greater solvent resistance and greater hardness than the films of Example 1. Chemical resistance and water immersion resistance are excellent.

Example 3
(OH-1B)

| Reactants | Moles | Parts |
|---|---|---|
| TDI (80/20; 2,4/2,6) | 1 | 174 |
| Polyoxypropylene derivative of trimethylolpropane (TMP plus 3 moles of propylene oxide) TP-116 (M.W. 308) | 2 | 616 |
| 2-ethoxyethyl acetate | | 99 |
| Xylene | | 99 |

Preparation of OH-1B: Same as in Example 1.

Properties of OH-1B:
    NCO/OH _____ 1/3
    Molecular weight _____ 796
    Equivalent weight _____ 199
    Hydroxyl number _____ 281
    Percent hydroxyl _____ 8.5

OH-1B in urethane surface coatings: When employed as the second component together with NCO-1 or NCO-3 in the NCO/OH proportions of Example 1, OH-1B gives urethane films which are less flexible but which have greater solvent resistance than the films of Example 1. Chemical resistance and water immersion resistance are excellent.

Example 4
(OH-1X)

| Reactants | Moles | Parts |
|---|---|---|
| Phenylene diisocyanate | 1 | 156 |
| Monoethylene oxide addition product of TP-116, a polyoxypropylene derivative of TMP having a M.W. of 308 (M.W. 350) | 2 | 700 |
| 2-ethoxyethyl acetate | | 107 |
| Xylene | | 107 |

Preparation of OH-1X: Same as in Example 1.

Properties of OH-1X:
    NCO/OH _____ 1/3
    Molecular weight _____ 864
    Equivalent weight _____ 216
    Hydroxyl number _____ 260
    Percent hydroxyl _____ 7.9

OH-1X in urethane surface coatings: When employed as the second component together with NCO-1 or NCO-3 in the NCO/OH proportions of Example 1, OH-1X gives urethane films which are less flexible but which have greater solvent resistance than the films of Example 1. Chemical resistance and water immersion resistance are excellent.

Example 5
(OH-1Y)

| Reactants | Moles | Parts |
|---|---|---|
| Diphenylmethane-4,4-diisocyanate | 1 | 250 |
| Addition product of 4 moles of propylene oxide to one mole of pentaerythritol (P-368T—M.W. 368) | 2 | 736 |
| 2-ethoxyethyl acetate | | 212 |
| Xylene | | 212 |

Procedure: Same as in Example 1.

Properties:
    NCO/OH _____ 1/4
    Average molecular weight _____ 984
    Average equivalent weight _____ 164
    Hydroxyl number _____ 342
    Percent hydroxyl _____ 10.3

OH-1Y in urethane surface coatings: When employed as the second component together with NCO-1 or NCO-3 in the NCO/OH proportions of Example 1, OH-1Y gives urethane films which are less flexible but which have greater solvent resistance and greater film hardness than the films of Example 1. Chemical resistance and water immersion resistance are excellent.

Example 6
(OH-1Z)

| Reactants | Moles | Parts |
|---|---|---|
| TDI (80/20; 2,4/2,6) | 1 | 174 |
| Addition product of 8 moles of propylene oxide to one mole of glycerine (M.W. 550) | 2 | 1,100 |
| 2-ethoxyethyl acetate | | 158 |
| Xylene | | 158 |

Procedure: Same as in Example 1.

Properties:
    NCO/OH _____ 1/3
    Average molecular weight _____ 1280
    Average equivalent weight _____ 320
    Hydroxyl number _____ 175
    Percent hydroxyl _____ 5.3

OH-1Z in urethane surface coatings: When employed as the second component together with NCO-1 or NCO-3 in the NCO/OH proportions of Example 1, OH-1Z gives urethane films which are slightly more flexible but which have slightly less solvent resistance than the films of Example 1. Chemical resistance and water immersion resistance are excellent.

Example 7
(OH-1P)

| Reactants | Moles | Parts |
|---|---|---|
| TDI (80/20; 2,4/2,6) | 1 | 174 |
| Addition product of 12 moles of propylene oxide to one mole of pentaerythritol (M.W. 840) | 2 | 1,680 |
| 2-ethoxyethyl acetate | | 123 |
| Xylene | | 123 |

Procedure: Same as in Example 1.

Properties:
    NCO/OH _____ 1/4
    Average molecular weight _____ 1860
    Average equivalent weight _____ 310
    Hydroxyl number _____ 181
    Percent hydroxyl _____ 5.5

OH-1P in urethane surface coatings: When employed as the second component together with NCO-1 or NCO-3 in the NCO/OH proportions of Example 1, OH-1P gives urethane films which are more flexible but which have less solvent resistance than the films of Example 1. Chemical resistance and water immersion resistance are excellent.

Example 8
(OH-1M)

| Reactants | Moles | Parts |
|---|---|---|
| TDI (80/20; 2,4/2,6) | 1 | 174 |
| Addition product of 4 moles of propylene oxide to one mole of trimethylolpropane (M.W. 360) | 2 | 720 |
| 2-ethoxyethyl acetate | | 113 |
| Xylene | | 113 |

Procedure: Same as in Example 1.

Properties:
    NCO/OH _____ 1/3
    Average molecular weight _____ 894
    Average equivalent weight _____ 223
    Hydroxyl number _____ 256
    Percent hydroxyl _____ 7.6

OH-1 in urethane coatings: When employed as the second component together with NCO-1 or NCO-3 in the NCO/OH proportions of Example 1, OH–1M gives urethane films which are less flexible but which have greater solvent resistance than the films of Example 1. Chemical resistance and water immersion resistance are excellent.

Example 9

(OH–1N)

| Reactants | Moles | Parts |
|---|---|---|
| TDI (80/20; 2,4/2,6) | 1 | 174 |
| Pentaerythritol addition product with four propylene oxide units and one ethylene oxide unit (M.W. 410) | 2 | 820 |
| 2-ethoxyethyl acetate | | 213 |
| Xylene | | 213 |

Procedure: Same as in Example 1.

Properties:
    NCO/OH _____ 1/4
        Average molecular weight _____ 1000
        Average equivalent weight _____ 167
        Hydroxyl number _____ 336
        Percent hydroxyl _____ 10.1

OH–1N in urethane surface coatings: When employed as the second component together with NCO–1 or NCO–3 in the NCO/OH proportions of Example 1, OH–1N gives urethane films which are less flexible but which have greater solvent resistance than the films of Example 1. Chemical resistance and water immersion resistance are excellent.

Example 10

(OH–1NX)

| Reactants | Moles | Parts |
|---|---|---|
| TDI (80/20; 2,4/2,6) | 1 | 174 |
| Addition product of 4 moles of propylene oxide to one mole of hexanetriol (M.W. 350) | 2 | 700 |
| 2-ethoxyethyl acetate | | 109 |
| Xylene | | 109 |

Procedure: Same as in Example 1.

Properties:
    NCO/OH _____ 1/3
        Average molecular weight _____ 880
        Average equivalent weight _____ 220
        Hydroxyl number _____ 255
        Percent hydroxyl _____ 7.7

OH–1NX in urethane surface coatings: When employed as the second component together with NCO–1 or NCO–3 in the NCO/OH proportions of Example 1, OH–1NX gives urethane films which are less flexible but which have slightly greater solvent resistance than the films of example. Chemical resistance and water immersion resistance are excellent.

Example 11

(OH–1EX)

| Reactants | Moles | Parts |
|---|---|---|
| Diphenylmethane-4,4'-diisocyanate | 1 | 250 |
| Addition product of 12 moles of propylene oxide to one mole of pentaerythritol (M.W. 850) | 2 | 1,700 |
| 2-ethoxyethyl acetate | | 415 |
| Xylene | | 415 |

Procedure: Same as in Example 1.

Properties:
    NCO/OH _____ 1/4
        Average molecular weight _____ 1915
        Average equivalent weight _____ 319
        Hydroxyl number _____ 176
        Percent hydroxyl _____ 5.34

OH–1EX in urethane surface coatings: When employed as the second component together with NCO–1 or NCO–3 in the NCO/OH proportions of Example 1, OH–1EX gives urethane films which are more flexible but which have less solvent resistance than the films of Example 1. Chemical resistance and water immersion resistance are good.

Example 12

(OH–1ET)

| Reactants | Moles | Parts |
|---|---|---|
| Diphenylmethane-4,4'-diisocyanate | 1 | 250 |
| Addition product of 9 moles of propylene oxide to one mole of trimethylolpropane (M.W. 660) | 2 | 1,320 |
| 2-ethoxyethyl acetate | | 195 |
| Xylene | | 195 |

Procedure: Same as in Example 1.

Properties:
    NCO/OH _____ 1/3
        Average molecular weight _____ 1562
        Average equivalent weight _____ 390
        Hydroxyl number _____ 144
        Percent hydroxyl _____ 4.3

OH–1ET in urethane surface coatings: When employed as the second component together with NCO–1 or NCO–3 in the NCO/OH proportions of Example 1, OH–1ET gives urethane films which are more flexible but which have less solvent resistance than the films of Example 1. Chemical resistance and water immersion resistance are good.

Example 13

(OH–132)

| Reactants | Moles | Parts | Weight, Percent |
|---|---|---|---|
| Polyoxypropylene derivative of trimethylolpropane, M.W. 411, Pluracol TP–440 | 3 | 2,466 | 62.4 |
| Tolylene diisocyanate, TDI (80/20; 2/4, 2/6) | 2 | 696 | 17.6 |
| 2-ethoxyethyl acetate | | 399 | 10 |
| Xylene | | 399 | 10 |
| | | 3,960 | 100.0 |

NOTE.—Ratio of reactive groups: NCO/OH=4/9=1/2.25.

(In place of Pluracol TP–440, other trimethylolpropane derivatives having 1–3 units of propylene oxide added to each hydroxy group may be used.)

Preparation of OH–132: 2466 parts of Pluracol TP–440 and 696 parts of tolylene diisocyanate are charged into a 5-liter reaction flask and stirred gently. The temperature of the exothermic reaction rises to 65° C. The blend is kept at this temperature for at least one hour until the exothermic reaction stops, whereafter 179 parts of 2-ethoxyethyl acetate and 179 parts of xylene are added in order to dilute the batch to 90% solids.

The temperature is then raised to 80° C. and the contents are heated for 3 hours with a gentle stirring. The viscosities are measured each hour.

Viscosity of the 90% solid batch reaches:

| | Gardner bubble viscosimeter readings | Centistokes |
|---|---|---|
| After 1st hour | Y–Z | 1,760–2,270 |
| After 2nd hour | $Z_1$–$Z_3$ | 3,390–4,630 |
| After 3rd hour | $Z_4$–$Z_5$ | 6,340–9,850 |

220 parts of 2-ethoxyethyl acetate and 220 parts xylene are added in order to dilute the batch to 80% solids. The contents are bottled.

Properties:
```
NCO/OH ------------------------------ 1/2.25
Average molecular weight ----------------- 1590
Average equivalent weight ---------------- 318
Hydroxyl number ------------------------- 177
Percent hydroxyl ------------------------ 5.36
```
Properties of OH–132 solution:
```
Non-volatile, percent -------------------- 80
Weight per gallon, lb. ------------------- 8.86
Viscosity at 25° C., cps. ----------- 1000–3000
```

OH–132 is more viscous and dries to touch faster upon evaporation of solvent than does the OH–1 of Example 1. The solvent resistance is less satisfactory than that of Example 1.

TWO COMPONENT URETHANE COATINGS

|  | Formulation | |
|---|---|---|
|  | 3 | 4 |
| COMPOSITION | | |
| Isocyanate-terminated intermediate | NCO–1 | NCO–3 |
| Parts | 63.3 | 101 |
| Hydroxy-terminated intermediate | OH–132 | OH–132 |
| Parts | 100 | 100 |
| NCO/OH | 1.2/1.0 | 1.2/1.0 |
| PROPERTIES | | |
| Curing time: | | |
| Dust free, hr | 1.0 | 1.2 |
| Dry to touch, hr | 3.0 | 3.0 |
| Pot life, hr | 48 | 48 |
| Sward hardness | 40–48 | 16–32 |
| Tensile strength, p.s.i | 3,000–4,000 | 3,800–4,600 |
| Impact test—Gardner, inch-lb.: | | |
| Direct | Over 30 | Over 30 |
| Indirect | Over 30 | Over 30 |
| Abrasion resistance, mg./1,000 cycles | 28 | 26 |
| Chemical resistance | Very good | Very good |
| Solvent resistance, hr.: | | |
| Toluene | 3 | 2 |
| 2-ethoxyethyl acetate | 2 | 1 |
| Methylisobutyl ketone | 2 | 1 |

It is to be understood that the invention is not limited to the exact details of operation or exact compounds shown and described, as obvious modifications and equivalents will be apparent to one skilled in the art, and the invention is therefore to be limited only by the scope of the appended claims.

I claim:

1. A hydroxy-terminated urethane composition prepared by mixing and reacting together about one molar proportion of arylene diisocyanate (a) selected from the group consisting of phenylene diisocyanate, tolylene diisocyanate, and diphenylmethane-4,4'-diisocyanate, with about two molar proportions of polyether polyol (b), said polyether polyol (b) being of the formula:

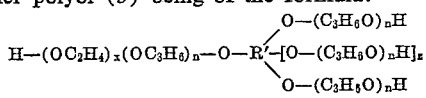

wherein R' with attached oxygen atoms represents the radical of a polyhydric lower-aliphatic alcohol, wherein n is a number from one to three, inclusive, and wherein x and z are individually numbers from zero to one, inclusive, to produce the desired hydroxy-terminated urethane composition, the initial reaction temperature being not greater than about sixty degrees centigrade.

2. A hydroxy-terminated urethane composition according to claim 1, wherein the arylene diisocyanate (a) is tolylene diisocyanate and the polyether polyol (b) is an alkylene oxide addition product of trimethylolpropane.

3. A hydroxy-terminated urethane composition according to claim 1 wherein the arylene diisocyanate (a) is tolylene diisocyanate and the polyether polyol (b) is a pentaerythritol alkylene oxide addition product.

4. A hydroxy-terminated urethane composition according to claim 1 wherein the arylene diisocyanate (a) is tolylene diisocyanate and the polyether polyol (b) is a hexanetriol alkylene oxide addition product.

5. A hydroxy-terminated urethane composition according to claim 1 wherein the arylene diisocyanate (a) is tolylene diisocyanate and the polyether polyol (b) is a glycerine alkylene oxide addition product.

6. A hydroxy-terminated urethane composition according to claim 1 wherein the average equivalent weight is between about 200 and about 400.

7. A solution of a hydroxy-terminated urethane composition according to claim 1 in a surface coating solvent which is non-reactive therewith.

8. A urethane coating composition including as one component a hydroxy-terminated urethane composition according to claim 1 and including an organic polyisocyanate as a second component.

9. A coating composition according to claim 8, including an organic surface coating solvent which is non-reactive with both the components of the coating composition and their polyurethane reaction product.

10. A process for the production of a hydroxy-terminated urethane composition which comprises mixing and reacting together about one molar proportion of arylene diisocyanate (a) selected from the group consisting of phenylene diisocyanate, tolylene diisocyanate, and diphenylmethane-4,4'-diisocyanate, with about two molar proportions of polyether polyol (b), said polyether polyol (b) having the formula:

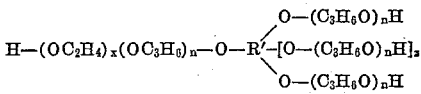

wherein R' with attached oxygen atoms represents the radical of a polyhydric lower-aliphatic alcohol, wherein n is a number from one to three, inclusive, and wherein x and z are individually numbers from zero to one, inclusive, to produce the desired hydroxy-terminated urethane composition, the initial reaction temperature being not greater than about sixty degrees centigrade.

11. A process for producing a hydroxy-terminated urethane composition according to claim 10, wherein the arylene diisocyanate (a) is tolylene diisocyanate and the polyether polyol (b) is an alkylene oxide addition product of trimethylolpropane.

12. A process for producing a hydroxy-terminated urethane composition according to claim 10, wherein the arylene diisocyanate (a) is tolylene diisocyanate and the polyether polyol (b) is a pentaerythritol-alkylene oxide addition product.

13. A process for producing a hydroxy-terminated urethane composition according to claim 10, wherein the arylene diisocyanate (a) is tolylene diisocyanate and the polyether polyol (b) is a hexanetriol-alkylene oxide addition product.

14. A process for producing a hydroxy-terminated urethane composition according to claim 10, wherein the arylene diisocyanate (a) is tolylene diisocyanate and the polyether polyol (b) is a glycerine-alkylene oxide addition product.

15. A novel branched hydroxy-terminated polyether-based urethane composition produced by mixing and reacting about one molar proportion of an arylene diisocyanate selected from the group consisting of tolylene diisocyanate, phenylene diisocyanate, and diphenylmethane-4,4'-diisocyanate, with about two molar proportions of a polyether polyol which is a propylene oxide addition product of a polyhydric lower aliphatic alcohol having at least three and not more than four hydroxy groups in the molecule, said polyol having at least one and not more than three propylene oxide units per hydroxyl group.

16. A process for the production of a novel branched hydroxy-terminated polyether-based urethane composition, which consists in mixing and reacting about one molar proportion of an arylene diisocyanate selected from the group consisting of tolylene diisocyanate, phenylene diisocyanate, and diphenylmethane-4,4'-diisocyanate, with about two molar proportions of a polyether polyol which is a propylene oxide addition product of a polyhydric lower aliphatic alcohol having at least three and not more than four hydroxy groups in the molecule, said polyol having at least one and not more than three propylene oxide units per hydroxyl group.

References Cited in the file of this patent

UNITED STATES PATENTS

| | | |
|---|---|---|
| 2,814,605 | Stilmar | Nov. 26, 1957 |
| 2,858,298 | Bunt | Oct. 28, 1958 |
| 2,866,774 | Price | Dec. 30, 1958 |
| 2,871,226 | McShane | Jan. 27, 1959 |
| 2,897,181 | Windemuth | July 28, 1959 |
| 2,901,467 | Croco | Aug. 25, 1959 |
| 2,948,691 | Windemuth et al. | Aug. 9, 1960 |

FOREIGN PATENTS

| | | |
|---|---|---|
| 205,456 | Australia | Jan. 4, 1957 |
| 206,295 | Australia | Feb. 10, 1955 |

OTHER REFERENCES

Abernathy: "Rubber World," March 1955, vol. 131, No. 6, pages 765–769.

Ogden: "Rubber World," July 1957, pages 537–542.

UNITED STATES PATENT OFFICE
CERTIFICATE OF CORRECTION

Patent No. 3,049,515                      August 14, 1962

Adolfas Damusis

It is hereby certified that error appears in the above numbered patent requiring correction and that the said Letters Patent should read as corrected below.

Column 3, line 8, after "of" insert -- a --; line 45, for "ractive" read -- reactive --; column 4, line 6, for "urethant" read -- urethane --; same column 4, footnote 1 of the first table, line 4 thereof, for "DI" read -- MDI --; column 5, table of Example 5, column 1, line 1 thereof, for "-4,4-" read -- -4,4'- --; column 6, line 74, for "OH-1" read -- OH-1M --.

Signed and sealed this 16th day of April 1963.

(SEAL)
Attest:

ERNEST W. SWIDER                          DAVID L. LADD
Attesting Officer                            Commissioner of Patents